United States Patent [19]

Bruce et al.

[11] Patent Number: 4,836,407

[45] Date of Patent: Jun. 6, 1989

[54] TAMPER-EVIDENT, DIFFERENTIAL PRESSURE-THERMOFORMED LIDDED PLASTIC CONTAINER

[75] Inventors: Robert Bruce; Robert W. Whitney, both of Litchfield, Ill.

[73] Assignee: CPC-Rexcel, Inc., St. Louis, Mo.

[21] Appl. No.: 81,695

[22] Filed: Aug. 4, 1987

[51] Int. Cl.[4] ............................................. B65D 17/40
[52] U.S. Cl. .................................... 220/276; 220/307
[58] Field of Search ............... 220/266, 270, 276, 306, 220/307; 215/254, 255, 256

[56] References Cited

U.S. PATENT DOCUMENTS

| | | |
|---|---|---|
| 795,102 | 7/1905 | Carnes . |
| 858,902 | 7/1907 | Norton . |
| 1,396,065 | 11/1921 | Schrader . |
| 1,432,506 | 10/1922 | Wells . |
| 1,700,611 | 1/1929 | Freeman . |
| 1,846,310 | 2/1932 | Chaplin . |
| 2,084,084 | 6/1937 | Greer . |
| 2,154,741 | 4/1939 | Gray . |
| 2,606,685 | 8/1952 | Erb . |
| 2,672,256 | 3/1954 | Sebell . |
| 2,682,359 | 6/1954 | Wigert . |

(List continued on next page.)

FOREIGN PATENT DOCUMENTS

| | | |
|---|---|---|
| 2302239 | 9/1976 | France . |
| 1489515 | 10/1977 | United Kingdom . |
| 2110239A | 12/1982 | United Kingdom . |

OTHER PUBLICATIONS

Brochure "Ring Lock Containers", published by DME Plastic A/S eight pages, plus two page chart (all unpaginated), undated.

Brochure "You Get Plastic Containers Full of Value . . . When you Buy from International Paper", published by International Paper Company, Consumer Plastics Division, four pages (unpaginated), undated.

Brochure extract "General Purpose Polystyrenes", published by Cosden Oil and Chemical Company, 4 pages (unpaginated), undated.

Brochure: "Welex . . . Polytrude *", published by Welex, Inc., pp. 1-13, undated.

*Primary Examiner*—Stephen Marcus
*Assistant Examiner*—Nova Stucker
*Attorney, Agent, or Firm*—Cushman, Darby & Cushman

[57] ABSTRACT

A container is provided in the form of a cup-like container body with a round mouth closed by a lid which becomes removably replaceable upon tearing away of a circumferentially extending tear strip which initially surrounds the mouth rim of the container body as a radially outer, integral part of the lid flange. As the lid is differential pressure-thermoformed, its radially outer region is formed into a generally inverted U-shaped structure which near the juncture of the base and radially outer leg of the inverted U, is provided, within the channel, with an inverted V-shaped notch of substantially diminished wall thickness to provide a line of weakness which preferably extends nearly fully around the circumference of the lid, but for at an angularly short tear-starting site. After the thermoforming step, and preferably in connection with triming the lid from the surrounding scrap portion of the sheet in which it was formed, a mechanical crimper axially collapses an initially radially outwardly concave annular portion of the radially outer leg of the inverted U, intermediate the vertical extent of that leg, with an upwardly, inwardly directed barb or hook which, cooperating with the rim of the cup provides the snap lock feature for securing the lid to the cup. After the initial lidding, it is this barb which prevents removal of the lid until the tear strip is torn away. Other cooperating structures preferably provided on the cup sidewall and the radially inner leg of the inverted U provide a surmountable-but-sufficient snaplock which continues to be useful after the tear strip has been removed. By preference, the desired action of the tear strip in removal is enhanced by simple instructions provided on the container, and/or by provision of a crack-initiating layer on the inner surface of the lid.

11 Claims, 7 Drawing Sheets

U.S. PATENT DOCUMENTS

| | | |
|---|---|---|
| 2,734,654 | 2/1956 | Roberson . |
| 2,775,362 | 12/1956 | Henchert . |
| 2,854,790 | 10/1958 | Hartung . |
| 2,880,859 | 4/1959 | Tupper . |
| 2,885,108 | 5/1959 | Donoghue . |
| 2,905,357 | 9/1959 | Riener . |
| 2,960,255 | 11/1960 | Blane . |
| 2,967,652 | 1/1961 | Canfield . |
| 3,052,371 | 9/1962 | Van Bemmelen . |
| 3,117,692 | 1/1964 | Carpenter et al. . |
| 3,142,413 | 7/1964 | Grogel . |
| 3,150,811 | 9/1964 | Amberg . |
| 3,178,051 | 4/1965 | Edwards . |
| 3,298,505 | 1/1967 | Stephenson . |
| 3,329,302 | 7/1967 | Kitchen . |
| 3,338,456 | 8/1967 | Kinnavy et al. . |
| 3,378,177 | 4/1968 | Gran . |
| 3,339,792 | 9/1967 | Biglin . |
| 3,391,852 | 7/1968 | Waldrop . |
| 3,410,697 | 11/1968 | Stephenson . |
| 3,474,928 | 10/1969 | Hurtt . |
| 3,476,287 | 11/1969 | Kinnavy . |
| 3,516,571 | 6/1970 | Roper et al. . |
| 3,561,668 | 2/1971 | Bergstrom . |
| 3,566,946 | 3/1971 | MacDonald . |
| 3,572,579 | 3/1971 | Mueller et al. . |
| 3,628,689 | 12/1971 | Rogers . |
| 3,688,942 | 9/1972 | Mitchell et al. . |
| 3,773,207 | 11/1973 | Dokoupil et al. ............. 220/266 X |
| 3,805,994 | 4/1974 | Cherry et al. . |
| 3,831,798 | 8/1974 | Rowe et al. .................... 215/256 |
| 3,840,152 | 10/1974 | Hodge . |
| 3,861,994 | 1/1975 | Stark .............................. 206/811 X |
| 3,880,288 | 4/1975 | Hunter . |
| 3,902,630 | 9/1975 | Knize . |
| 3,913,785 | 10/1975 | Pattershall . |
| 3,934,749 | 1/1976 | Andrulionis .............. 229/125.05 X |
| 3,944,115 | 3/1976 | Moonan et al. . |
| 3,946,871 | 3/1976 | Sturm . |
| 3,946,872 | 3/1976 | Sturm . |
| 3,951,331 | 4/1976 | Smith et al. . |
| 3,956,550 | 5/1976 | Sutch . |
| 3,956,616 | 6/1976 | Ridgeway . |
| 3,977,563 | 8/1976 | Holt . |
| 4,024,976 | 5/1977 | Acton . |
| 4,027,775 | 6/1977 | Mygatt, Jr. et al. . |
| 4,034,889 | 7/1977 | Hammes et al. . |
| 4,079,857 | 3/1978 | Crisci . |
| 4,090,004 | 5/1978 | Tebbutt et al. . |
| 4,101,050 | 7/1978 | Buckler et al. .................. 229/3.5 R |
| 4,111,329 | 9/1978 | Lampman . |
| 4,113,136 | 9/1978 | Abbott ............... 220/276 |
| 4,180,129 | 12/1979 | Hoenig et al. . |
| 4,220,254 | 9/1980 | Morton . |
| 4,235,349 | 11/1980 | Uhlig . |
| 4,256,240 | 3/1981 | Woiarski . |
| 4,294,371 | 10/1981 | Davis . |
| 4,296,871 | 10/1981 | Andersson . |
| 4,300,700 | 11/1981 | Chang . |
| 4,334,631 | 6/1982 | Ballester . |
| 4,335,827 | 6/1982 | Knize et al. . |
| 4,346,833 | 8/1982 | Bernhardt . |
| 4,360,118 | 11/1982 | Stern . |
| 4,373,636 | 2/1983 | Hoffman . |
| 4,376,493 | 3/1983 | Gall . |
| 4,378,895 | 4/1983 | Woinarski . |
| 4,386,715 | 6/1983 | Morton . |
| 4,438,864 | 3/1984 | Helms . |
| 4,444,332 | 4/1984 | Widen et al. . |
| 4,476,993 | 10/1984 | Krout . |
| 4,487,329 | 12/1984 | Winstead ............... 220/276 |
| 4,488,658 | 12/1984 | Smith et al. ............. 220/276 |
| 4,493,432 | 1/1985 | Smith . |
| 4,496,070 | 1/1985 | Lane, Jr. . |
| 4,502,608 | 3/1985 | Mills .................. 215/254 X |
| 4,580,692 | 4/1986 | La Barge et al. . |
| 4,605,137 | 8/1986 | Taragna et al. ............. 215/254 |
| 4,660,735 | 4/1987 | Peschardt et al. ............. 220/276 |

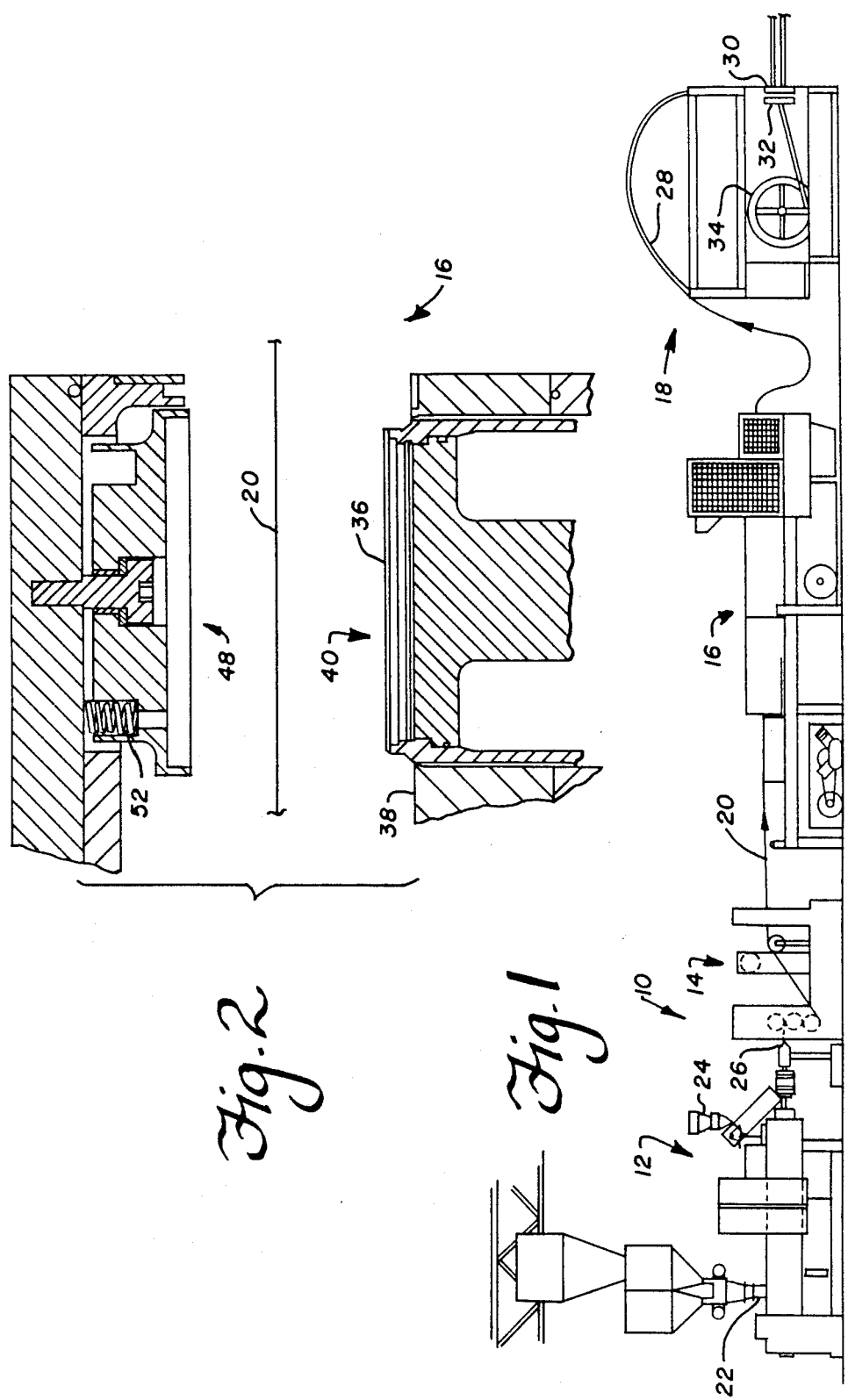

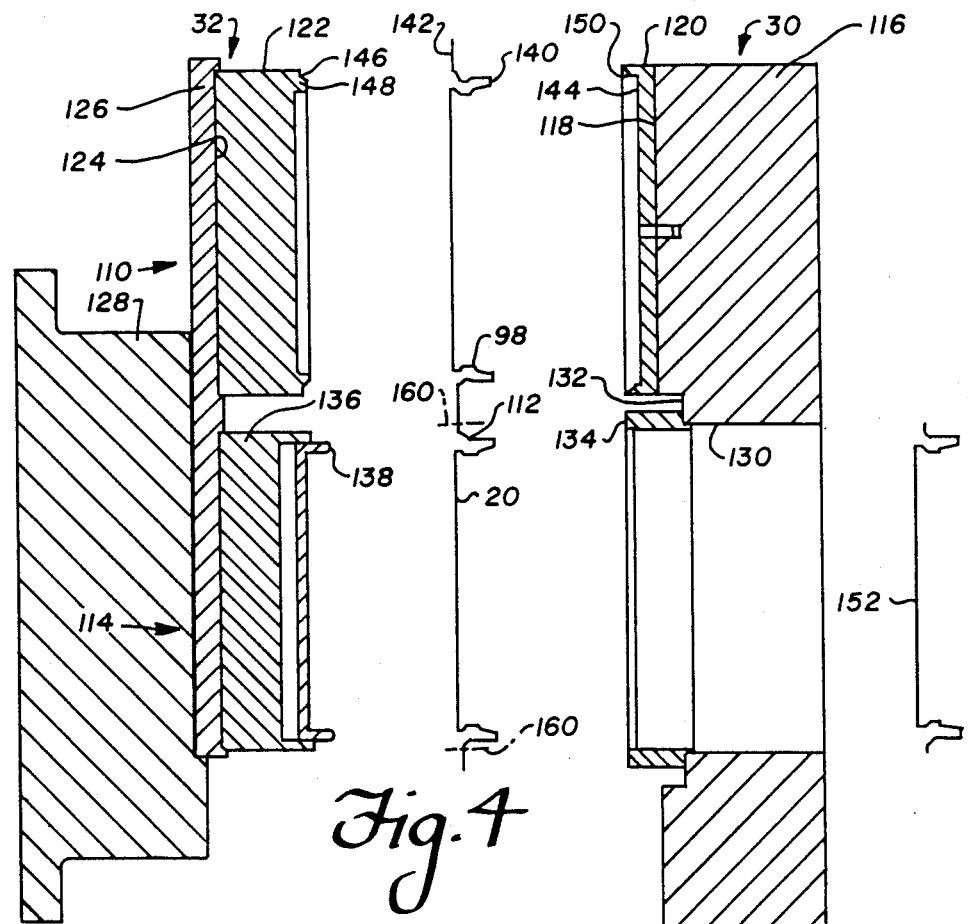
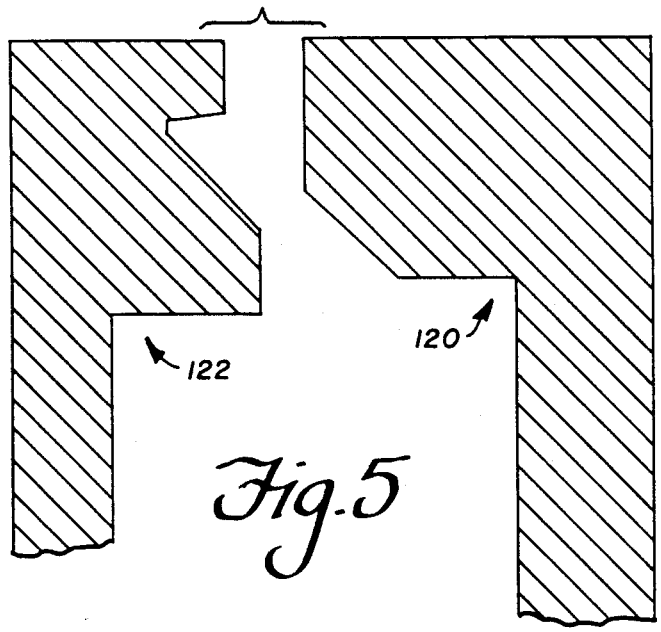

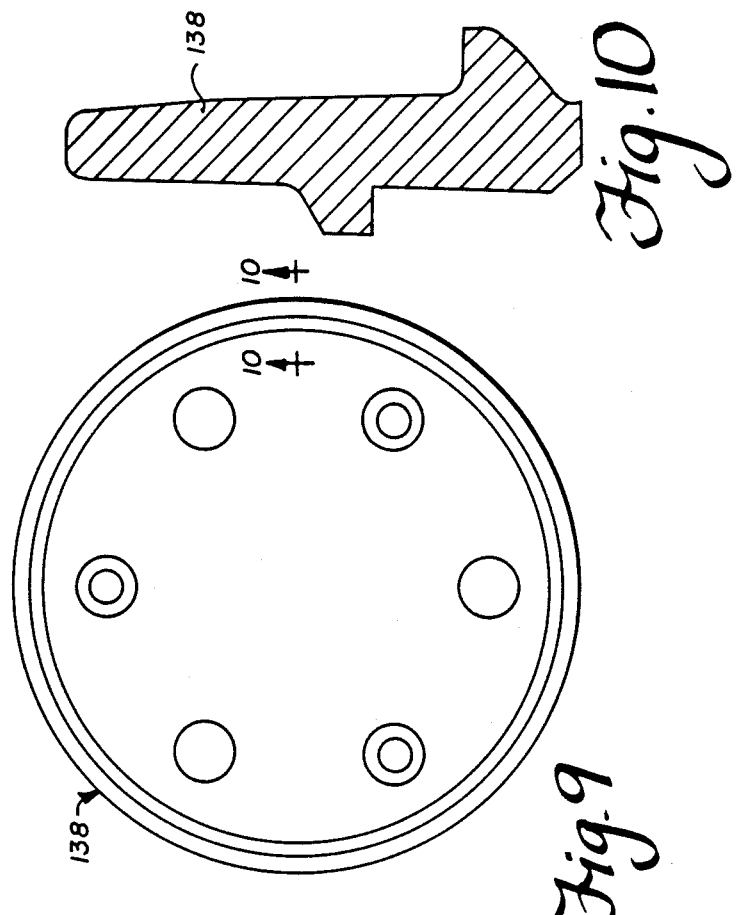
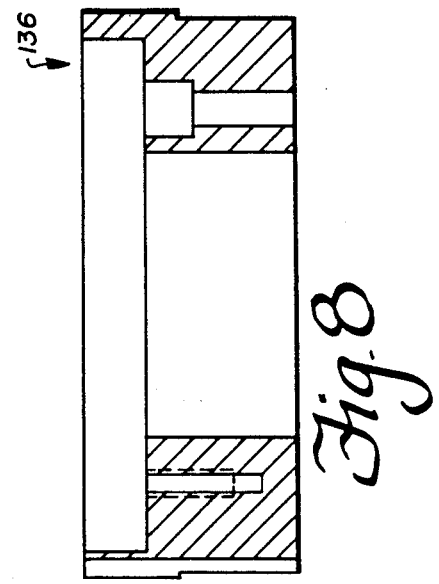

TAMPER-EVIDENT, DIFFERENTIAL PRESSURE-THERMOFORMED LIDDED PLASTIC CONTAINER

BACKGROUND OF THE INVENTION

In recent years, consumer products such as cultured dairy products (typified by cottage cheese, sour cream, dips and yogurt), prepared meat (typified by chicken livers and ground ham) and delicatessen products (typified by potato salad and oil-cured black olives) have come to be packaged in differential pressure-thermoformed, lidded containers, as have a great number of other food and non-food items. Most typically, the cup-portions and lid-portions of these containers are differential pressure-thermoformed from initially uniform-thickness thermoplastic sheeting, most often made of polystyrene. Although the lids and cups may be formed from sheeting which is equal in thickness with one another, it is not uncommon for one thickness of sheeting to be used in making the cups and another thickness of sheeting to be used in making the lids. And even in instances where the sheeting may originally have been of the same thickness, differences in drawing depth into a die cavity may cause, and usually does cause, various regions of the walls of the lids and cups to be of thicknesses which, while highly uniform from one cup to the next and from one lid to the next, are different from one another.

For illustrative purposes, a twenty-four ounce differential pressure-thermoformed lidded polystyrene container for cottage cheese may be selected as typical of the container to which the present invention is addressed as an improvement. Looking in 1987, in the United States, at the typical package of this type which is widely marketed, one notices a number of factors. The lidded container is made of thin, stiffly flexible material. Particularly the middle portion of the cup sidewall has some "give" to it, although its lower corner is stiff enough to resist denting in normal filling, supply, carrying home from the grocery and in holding while scooping out the product. So, too, at the interfacial ring where the lid removably sealingly stops the mouth of the cup, the material is sufficiently stiff and resilient that there is an interference fit which helps hold the lid in place; a significant, but readily manually-supplied force must be applied to intentionally pluck or extract the lid from the container, but in the normal supplying and carrying home of the filled, lidded container, neither the cup nor the lid usually distorts sufficiently to cause the lid/cup seal to be broken or the lid to come off. The typical conventional such lidded container is very inexpensive and contributes little to the total cost of even a small quantity of a modestly priced consumer product (such as sixteen ounces of cottage cheese); so little, in fact, that the consumer is most apt to treat the conventional lidded container as a disposable item, or as a "free" reuseable container for leftovers, to use once more in the packing of lunches and the like.

Part of the low cost nature of such containers stems from the fact that manufacturing of them may be done on a large scale, because so many products of so many manufacturers are packaged in virtually the same such containers, but for surface graphics.

But, as a result, the containers often are made in plants that are geographically as well as financially separated from where the cups will be filled and lidded. Accordingly, another part of the success of such a container is that its parts must be able to be exteriorly printable on available machinery, preferably without more than minor modifications or adjustments; must be deeply nestable for cost-efficient boxing and shipping; and preferably are de-nestable, fillable and closable and conveyable on equipment that is already installed in the packer's plant, preferably without more than minor modifications or adjustments.

One might profitably consider at this juncture why, if such a proven, worthwhile, de-bugged product is so widely, conveniently and inexpensively available, would anyone want to go beyond what is conventional and to propose that changes be made.

An answer may be found in contemplating the highly publicized instances of consumer product tampering in the late 1970's - early 1980's, e.g. Tylenol: some manufacturers and packers of conventional lidded containers for cottage cheese and the like began to become concerned with whether, at least in some instances, these conventional lidded containers could be elaborated upon or, modified so as to make them tamper-proof, or if not tamper-proof, then at least provided with a readily tamper-evident feature.

One solution which appeared is the provision of an inner seal, i.e. a membrane which is sealed across the mouth of the filled cup under and independently of the lid. However, such a feature adds structure, expense, weight and processing steps to the packaged product and so is of limited acceptability. Also, it may require a substantial further investment in equipment at the packer level, not be feasible for use with a wide variety of container fillings, and indeed, be of limited acceptability as either a tamper-proofing or tamper-evidencing feature, because the consumer usually must remove the container lid in order to inspect whether the inner seal remains intact. Also, it may not always be easy to notice whether a portion of the edge of the inner seal has been pulled-away from the cup mouth rim.

To the knowledge of the present inventors, others have designed tamper-evidencing features into somewhat similar (e.g. sometimes competitive) injection molded lidded containers. However, there, the solutions are different in that they rely on making mold modifications which can provide lugs, protuberances, perforations and the like, solutions which are not feasible to build into a product which is to be differential pressure-thermoformed from uniform thickness synthetic plastic resin sheeting, e.g. made of polystyrene.

A sheet of polystyrene which has been extruded, like some other webs, usually retains in its physical structure artifacts of the direction of its extrusion. For instance, a newspaper can be ripped along a fairly straight line if one rips lengthwise of the paper web from which the newspaper was manufactured, but is much more difficult, in fact nearly impossible, to rip straightly crosswise of the web. Heretofore, the fact that polystyrene sheet cannot be ripped uniformly in all directions seems to have left other proposals for mass manufacturing two-piece tamper-evident lidded containers mere paper proposals, without a way of being commercially realized, despite the strongly-felt need.

In order to avoid being left without a product to satisfy the tamper-evident lidded container market, manufacturers of differential pressure-thermoformed containers made of polystyrene sheet have attempted other measures, in addition to the internal mouth-blocking barrier diaphragm mentioned above. One of these ways is to provide for the juncture between the cup and the lid an externally encircling band made of a heat-shrinkable material. On a filling line, using such an expedient requires the use of trays or the like for holding the lidded containers and the bands at the correct height relative to the cup/lid juncture until the assembly has passed through the shrink tunnel. Others have completely shrink-wrapped the lidded container with a layer of clear-plastic sheet. The added cost of wholly or partly shrink-wrapping a lidded container can easily amount to one hundred thousand dollars per packaging line, and the added cost of supplies for the third part of the package and for operating the line can easily run to 7 to 8 dollars per thousand containers.

The present inventors, together with their colleague, Gerald Burnett, in the 1983-1984 time period, devised what they believe to be the first technically feasible snap-together lidded cup made of differential pressure-thermoformed, generally uniform thickness synthetic plastic resin sheeting, e.g. made of polystyrene.

In that development, a container was provided in the form of a cup or container body with a round mouth removably closed by a lid, both differential pressure-thermoformed of stiffly flexible synthetic plastic resin sheeting, such as polystyrene. For providing a tamper-evidencing feature, the sidewall of the cup, adjacent the mouth, was integrally, circumferentially provided with an axially and radially surrounding guard flange. This flange was located at such a close proximity to the outer profile of the lid, when the lid is fully seated following filling of the cup with a product such as cottage cheese, that the consumer's fingers virtually cannot get at the lid or get between the lid and the cup to pluck or pry off the lid, nor can the user's fingers get under the outer edge of the lid to remove the lid from the cup. The guard flange was provided at two adjacent sites with radially directed notches or other lines of weakness defining between them a tab. Accordingly, the lid was designed to be removed from the cup by first pressing down on the guard flange tab defined between the two lines of weakness, thus splitting the guard flange along these two radially directed lines. Deformation was planned to be such that the tab then angles downwards at an angle that permits the user to get a finger between the tab and lid, under the outer periphery of the lid, so that the lid may be lifted up and removed. However, the deformation was also planned to be such as to give a conspicuous indication that the container lid has once been removed after the container was filled and lidded. The container was proposed to be filled and closed on largely if not wholly the same equipment as is widely in use at dairies, food processors and similar packers.

While that tamper-evident container reached a development and testing stage, it was never commercialized. That was principally because then-current U.S. Food and Drug Administration guidelines or regulations relating to containers for retailing packaged foodstuffs such as cottage cheese to consumers required that the mouth rim of the cup portion of the container be covered by a radially outer flange part of the lid, rather than vice versa, so that any debris which might have accumulated in that region between the time when the cup was lidded and the time when the lid was removed by the consumer would come off with the lid, rather than become free to fall from the cup rim region into the food in the unlidded cup. Thus, while that product was believed to be technically feasible, for governmental regulatory reasons it was not deemed to be a suitable answer to tamper-proofing or rendering tamper-evident consumer packages of cottage cheese and the like. It is believed to remain a suitable response to providing tamper-evident packaging for non-food products, and for food products if and where not governed by the abovementioned packaging regulations.

Accordingly, the present invention grew out of a desire to provide snap-together lidded cups made of differential pressure-thermoformed plastic resin sheeting, which made use of some of the principles learned as the aforementioned prior invention of Burnett et al was being devised, developed and tested, but which would provide a container which is useful under current USFDA guidelines and regulations for use in packaging food retailed to consumers. A comparatively difficult part of the present invention was devising ways and means for providing the circumferentially extending tear strip on the lid so that it could be easily and reliably torn-off by consumers provided with minimal and simple instructions.

SUMMARY OF THE INVENTION

A container is provided in the form of a cup-like container body with a round mouth closed by a lid which becomes removably replaceable upon tearing away of a circumferentially extending tear strip which initially surrounds the mouth rim of the container body as a radially outer, integral part of the lid flange. As the lid is differential pressure-thermoformed, its radially outer region is formed into a generally inverted U-shaped structure which near the juncture of the base and radially outer leg of the inverted U, is provided, within the channel, with an inverted V-shaped notch of substantially diminished wall thickness to provide a line of weakness which preferably extends nearly fully around the circumference of the lid, but for at an angularly short tear-starting site. After the thermoforming step, and preferably in connection with trimming the lid from the surrounding scrap portion of the sheet in which it was formed, a mechanical crimper axially collapses an initially radially outwardly concave annular portion of the radially outer leg of the inverted U, intermediate the vertical extent of that leg, with an upwardly, inwardly directed barb or hook which, cooperating with the rim of the cup provides the snap lock feature for securing the lid to the cup. After the initial lidding, it is this barb which prevents removal of the lid until the tear strip is torn away. Other cooperating structures preferably provided on the cup sidewall and the radially inner leg of the inverted U provide a surmountable-but-sufficient snaplock which continues to be useful after the tear strip has been removed. By preference, the desired action of the tear strip in removal is enhanced by simple instructions provided on the container, and/or by provision of a crack-initiating layer on the inner surface of the lid.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

FIG. 1 is a somewhat schematic side elevational view of a production line for manufacturing lids for tamper-evident containers according to a preferred embodiment of the present invention;

FIG. 2 is a larger scale fragmentary cross-sectional view of apparatus for differential pressure-thermoforming the lid in the warm sheet of extruded synthetic plastic resin, depicted as the apparatus is about to come together to form an increment of the sheet;

FIG. 4 is a somewhat schematic fragmentary cross-sectional view of apparatus for crimping and trimming the lid in two successive steps using a preferred form of apparatus in which members of the crimping apparatus are mounted to respective members of the trimming apparatus;

FIG. 5 is a larger-scale fragmentary cross-sectional view of the crimping portion of the apparatus of FIG. 4;

FIG. 8 is a longitudinal sectional view thereof taken on line 8—8 of FIG. 7;

FIG. 9 is a front elevation view of the pilot for the trim punch of FIG. 7;

FIG. 10 is a fragmentary longitudinal sectional view thereof taken on line 10—10 of FIG. 9;

FIG. 13 is a fragmentary perspective view of a lidded container of the invention as the tamper-evident feature band is being torn-off circumferentially of the lid along the line of weakness; and FIG. 14 is an expanded-scale schematic fragmentary cross-section view of the region of the lid where the line of weakness is located, illustrating the coextruded character of the lid material and the existence of the crystal polystyrene lamina at the line of weakness.

DETAILED DESCRIPTION

Figure 3:
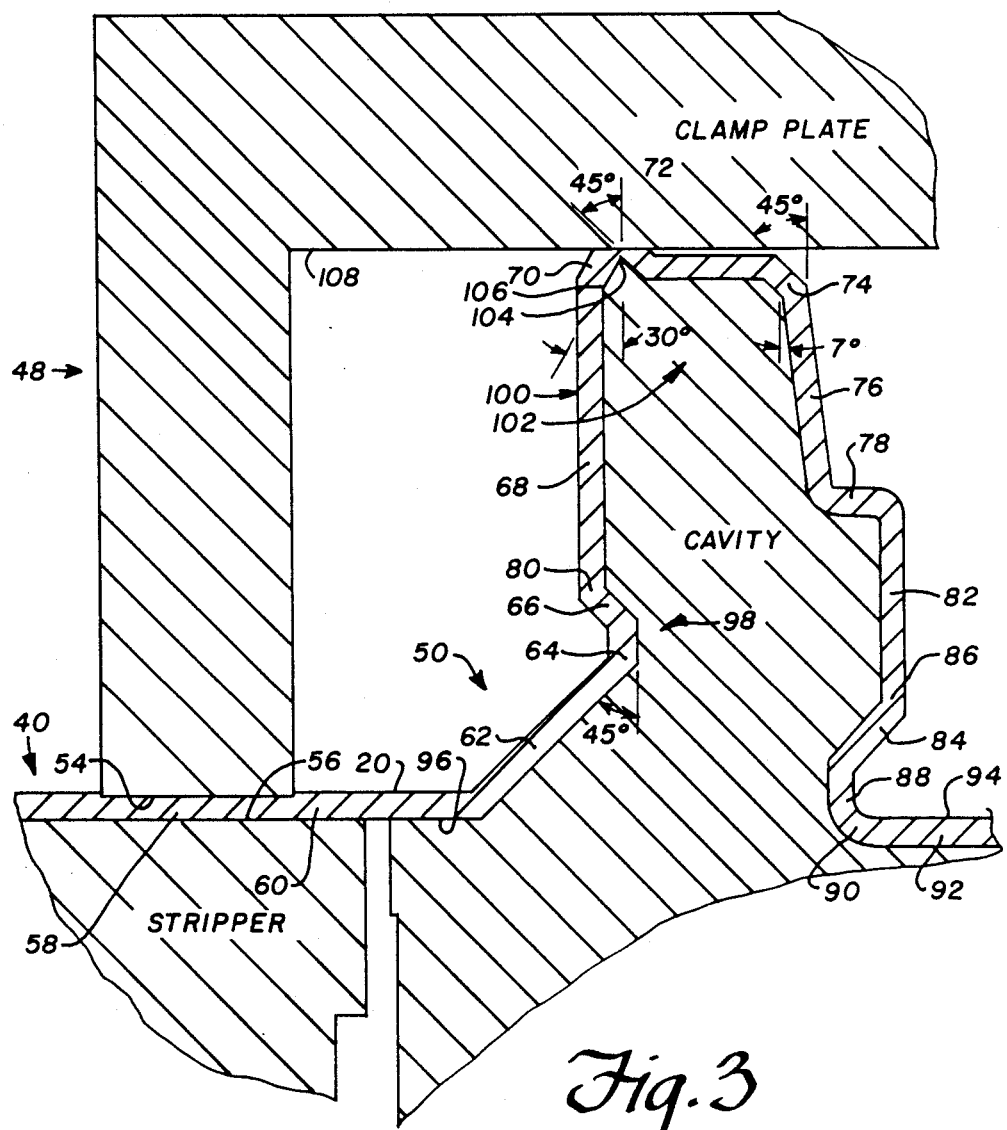
FIG. 3 is a larger scale, somewhat schematic fragmentary cross-sectional view of the apparatus of FIG. 2 and the sheet which has been formed thereby, depicted at a time when the apparatus is about to withdraw from the formed sheet.
Figure 7:
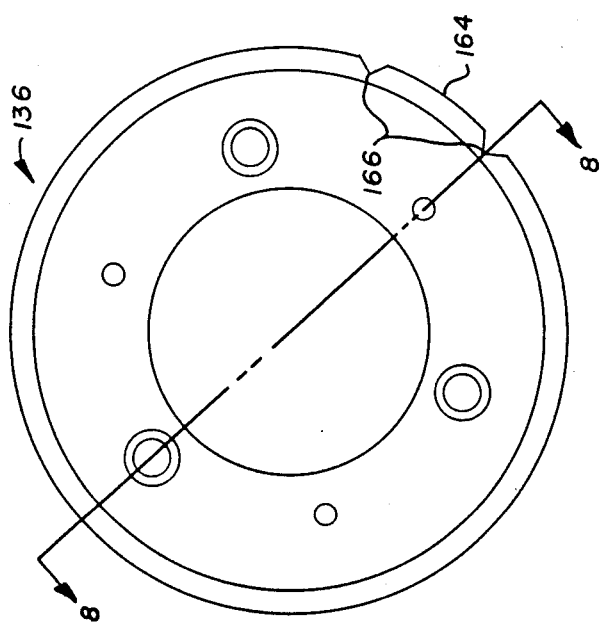
FIG. 7 is a front elevation view of the trim punch of the trimming portion of the apparatus of FIG. 4.
Figure 6:
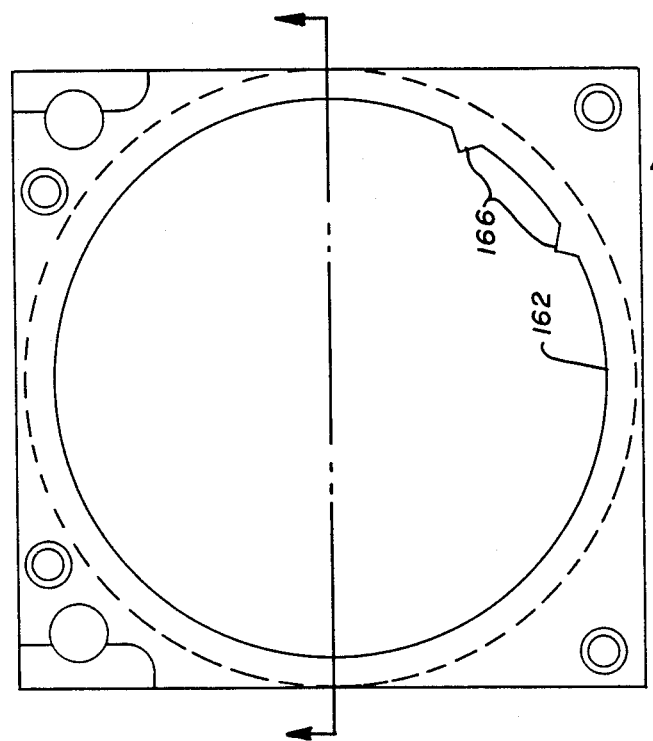
FIG. 6 is a front elevation view of the trim die of the trimming portion of the apparatus of FIG. 4.

A production line for producing the lids of the tamper-evident lidded container of the present invention is illustrated at 10 in FIG. 1. To convey an appreciation for the scale of the figure, the overall length of the line as depicted is seventy-eight feet, nine inches. Although the line is shown being a single series of stations which serially perform their functions on the continuously throughput material, it could be broken, between stations and/or functions, into two or more lines, with partially processed material rolled-up and unrolled, or stacked and destacked at the final station on one line and the initial station on a succeeding line.

In general, the production line 10 is shown including a sheet-extruding station 12, a cooling station 14, a differential pressure-thermoforming station 16, and a combined crimping and trimming station 18.

The purpose of the sheet-extruding station 12 is to continuously manufacture a supply of pellets, particles or similar bodies of synthetic thermoplastic resin into a flat sheet 20.

By preference, the sheet 20 is seventeen mils thick and is constituted by a coextrusion of a layer of high-impact polystyrene 14–16 mils thick and a layer of crystal polystyrene 1–3 mils thick. The high impact polystyrene may be Cosden 525E impact polystyrene available in the U.S.A. from Cosden Oil and Chemical Co., of Dallas, Tex., and the crystal polystyrene may be Cosden 525, available from the same source. The technology for making such a coextruded sheet is well known, and apparatus for making it is commercially available, e.g. the Polytrude multilayer flat sheet coextrusion system available in the U.S.A. from Welex Incorporated, of Blue Bell, Pa.

A coextruded sheet, having a main layer of impact polystyrene and an outer layer of crystal polystyrene, has been known in the field of manufacturing differential pressure-thermoformed container bodies, as a way of providing a glossy surface to a normally dull polymer, for enhancing the appearance of the containers. And, as a result of much experience with such container bodies, it has been known that coating a thin-walled body of high impact polystyrene with a layer of crystal polystyrene will increase the propensity of the wall of the body to crack, especially if the crystal polystyrene layer is thicker than minimally necessary to provide a shiny surface on the body. As a result, the custom in the trade when using an external glazing of crystal polystyrene has been to minimise its thickness in order to avoid causing unwanted cracking-susceptability.

Accordingly, in the instance depicted, a supply of high impact polystyrene is fed to an extruder at 22, a supply of crystal polystyrene is fed to the extruder at 24, and the coextruded sheet 20 emerges from the conventional flat die at 26.

In its as-extruded form, the emerging sheet 20 is too hot to differential pressure-thermoform. Accordingly, it is passed through a cooling station 14 where, typically, it passes around rolls which are served with an internal flow of cooling water. The cooled sheet 20, in the preferred embodiment, passes directly to a differential pressure-thermoforming station 16, in which conventional practices are used for locally deforming the sheet to provide a succession of regions that will later be further processed and severed to become respective lids. This station is not described in detail, other than to describe the dies hereinbelow in somewhat more detail, because those skilled in the art will already be well familiar with it. Suffice it to state that in this station, if the sheet has been cooled to below the temperature required for good practice in differential pressure-thermoforming, it is first warmed, then passed between mold members which close about a regional site on the sheet.

A combination of pressure and vacuum is applied to opposite faces of the sheet at the site trapped in the mold causing the sheet in that region to deform to follow the shape of the mold cavity/plug, whereupon the mold members open away from the sheet. Typically, the sheet 20 is substantially broader than would be needed to produce one lid per width; simultaneous production of four lids in a row extending transverally of the sheet, per mold closure per increment of sheet length would not be untypical, in apparatus having a corresponding plurality of mold cavities/plugs. In such a practice, the advance of the sheet through the differential pressure-thermoforming station can be in an indexing manner, with slack being accommodated in the region between the continuous extruder cooling station 14 and the molding station 16. Alternatively, it is possible to have the sheet 20 travel at a constant speed through the molding station 16 providing that the mold members travel downstream with the sheet while engaged therewith and retreat quickly upstream for the next engagement after opening away from an increment in which molding has just been completed.

The orientation of the sheet 20 relative to the molding members in the molding station 16 is such that the crack-initiating crystal polystyrene layer, when provided, will form the inside surface of the lids. (If the sheet 20 also is provided at the coextruding station 12 with a crystal polystyrene layer on the opposite face of the main, impact polystyrene layer, that other crystal polystyrene layer should be as thin as possible, consistent with providing a glossy outer surface for the lids without substantially affecting cracking propensity.)

Although it cannot be shown clearly at the scale of FIG. 1, the sheet 20 passing from the differential pressure-thermoforming station 16 to the combined crimping and trimming station 18 has a succession of deformations molded therein, which, when further processed and cut from the remainder of the sheet in the station 18, will become a succession of individual lids.

In the instance depicted, the molded sheet 20 travels upwards, over the station 18 on guides 28, then vertically downwards on the downstream end of that station so as to pass between a transversally-extending, vertically-oriented fixed plate 30 and a likewise disposed plate 32 which is located in front of the plate 30, in confronting relation thereto, and arranged to be reciprocatingly moved towards and away from the plate 32, e.g. by a pitman 34. The output of the station 18 is a succession of lids, and a sheet remainder, which typically is cut-up and recycled to the sheet extruder 12 to provide a portion of the feed thereto.

The cups, i.e. the container bodies used in practicing the same invention, may be absolutely conventional ones, e.g. made by a process similar to that used for making the lids, as described above. As is conventional, the crystal polystyrene layer, if provided, should be as thin as possible, consistent with providing a glossy external surface for the cups without substantially increasing their propensity to crack.

In operations subsequent to those performed on a line such as the line 10, the cups and lids are subject to being printed with external graphics and/or labeled, nested, boxed, de-nested, filled, closed, rinsed, conveyed, packed, shipped and merchandised, in virtually the same manner as lidded containers which are similar but for missing the tamper-evidencing features (described below) of the containers of the present invention. The lids and container bodies are stiffly resiliently flexible, so much so as to generally maintain the shape shown, yet be sufficiently elastically deformable as to permit the lid to be removably retained in closing relation to the cup mouth.

FIG. 2 is an enlarged scale vertical sectional view of the differential pressure-thermoforming station 16, shown as the mold cavity assembly 36/stripper plate 38 (collectively, 40) and plug base 42/sealing plate 44/clamp plate 46 (collectively 48) members of the mold are about to close against opposite faces of the sheet 20.

These mold members 40, 48, and the operation of the differential pressure-thermoforming equipment at the station 16 are utterly conventional, except for specific features of the shape of the cavity member of the mold, as will now be described in more detail with reference to FIGS. 2 and 3.

FIG. 3 shows, on a larger scale, the mold members 40, 48 closed against the sheet 20 which they have molded to produce a region 50 which, after further processing at the combined crimping and trimming station 18, will become a lid. At the stage depicted in FIG. 3, the lid region 50 remains integrally peripherally connected to the sheet 2.

The dimensions of the mold, its conventional mounting structures and the stiffness of the springs 52 (only one shown), which resiliently stand the clamp plate off from the plug base are such that the 17 mil thickness of the sheet 20 is pinchingly penetrated between the annular end surface 54 of the clamp plate 46 and the confronting flat end surface of the stripper plate 56 by one mil whereupon a pressure differential exerted on opposite sides of the sheet 20 through the mold (through piston movement and/or conventional ports (not shown)), push and pull the sheet, within the clamped perimeter 58, against the mold cavity. In general, all of the mold features are of full circular extent, with one important exception, which will be further explained below.

Beginning with a description at the inner extent of the clamped perimeter 58 and proceeding radially inwards, the sheet 20, as deformed by the mold, has a flat annular portion 60, a frusto-conically upwardly tapering portion 62, an axially short upwardly extending cylindrical tubular portion 64, a frusto-conically upwardly flaring portion 66 which is substantially less radially and axially extensive than the portion 62, an axially longer upwardly extending cylindrical tubular portion 68, an upwardly tapering chamfer 70, (skipping another feature for a moment), a flat annular upper end portion 72, a downwardly flaring chamfer 74, a downwardly slightly tapering tubular inner portion 76, a radially inwardly extending annular shoulder 78 (which is disposed at a level somewhat above that of the juncture, at 80, between the flaring portion 66 and the tubular portion 68), an axially downwardly extending cylindrical tubular portion 82, a downwardly frusto-conically flaring portion 84 (having a juncture 86 with the cylindrical tubular portion 82 that is located at a level which is axially intermediate the extent of the tapering portion 62), and an axially short, downwardly extending cylindrical tubular portion 88 which curves at a fillet 90 into a flat, central disk portion 92, the upper surface 94 of which is disposed at approximately the same level as the lower surface 96 of the flat annular outer rim portion 60.

The portions 62, 64, 66, in combination, provide a precursor for a barb or hook, which will be described hereinbelow, and constitute a radially outer, radially outwardly concave/radially inwardly convex circumferentially extending distortion 98 on the outer leg 100 of an inverted U-shaped circumferentially extending groove 102 formed in the part of the sheet 20 which will become one lid. (To clarify the spatial references used in relation to FIG. 2, in this Figure, the portion of the sheet 20 which will become one lid is shown in a right-side-up orientation. Clearly, it would not depart from the principles of the invention to mold the lid in an upside-down orientation, in the case of which the above-given axially-related spatial references should be reversed.) The intent of the inventors, is to mold the distortion 98 about as sharply and deeply as can be done in a high speed, commercial-scale production line without needing to divide the mold cavity into a number of complicated relatively movable parts.

The sole feature of the molded part of the sheet which will become one lid that is not circumferentially uniform is the feature 104 which is shown provided on the upper end 72 of the inverted groove 102 contiguously with the radially outer chamfer 70. In this region, throughout all but a minor portion (preferably 30) of the angular extent, the upper end wall of the groove is provided with a V-profiled line of weakness. This feature 104 is partly molded by a V-shaped ridge 106 provided apex-upwards on the mold member and partly by compression molding of the respective region of the sheet 20 between the V-shaped ridge 106 and the flat underside surface 108 of the clamp plate 46 of the mold. The thickness of the sheet 20 as molded between the apex of the V-shaped ridge 106 and the underside surface of the clamp plate 46 preferably is 0.005 inch. The overall height of the inverted U-shaped groove, from the upper surface of the outer rim flange 60 to the upper surface of the feature 104 is 0.350 inch, in the preferred embodiment.

The shape of the molded sheet, as shown in FIG. 3 is preserved as the mold is opened and the molded sheet is conventionally stripped from the mold cavity.

As the production line continues to operate, the increment of the sheet 20 shown molded in FIG. 3 is soon brought into the combined crimping and trimming station 18, i.e. to a position between the fixed and movable plates 30 and 32 (FIGS. 1 and 4).

FIG. 4 shows on a larger scale than FIG. 1 the travel of the molded sheet 20 between the plates 30 and 32. FIGS. 5-10 show details of the plates 30 and 32 in greater detail.

In the preferred embodiment, the molded sheet 20 is travelling downwardly between the plates 30, 32 in FIG. 4. Each time the sheet travel stops, the movable plate reciprocates toward and away from the sheet 20 and each time the sheet advances, while the plates 30, 32 are spaced from one another, it advances by one increment, i.e. by one lid's worth. Because the station 18 is a combined station, in the preferred embodiment, two operations are successively conducted there. In the first operation, as the plate 32 closes towards the plate 30, a molded portion of sheet 20 which will become a lid is crimped at 110 (in an operation which will be further described below), in order to convert the barb precursor or hook precursor 62, 64, 66 into an actual barb or hook 112. In the second operation, as the plate 32 closes toward the plate 30 the next time, after the sheet 20 has advanced by one increment, the potential lid 50 is trimmed from the remainder of the sheet 20 at 114 along a perimetrical line which is circular but for two V-shaped notches, the apices of which point radially inwardly towards the respective ends of the line-of-weakness feature 104.

In FIG. 4, the fixed plate 30 comprises a die shoe 116, having an inner face 118 to which is mounted at the crimping sub-station 110, a nest 120 for a crimping tool 122 which is mounted in a co-axially confronting relationship thereto on the inner face 124 of a mount base 126 which is, in turn, mounted to the inner face of a punch shoe 128. The fixed shoe 116 further is provided axially horizontally therethrough with a die shoe opening 130 having a perimetrical shoulder 132 on which is mounted an annular die 134. Also mounted on the inner face 124 of the mount base 126 is a punch 136 having a pilot 138.

The fixed plate 30 and movable plate 32 are preferably made as disassemblable assemblies, as shown, so that different elements can be made of different metals, for taking advantage of respective qualities, and in order to facilitate maintenance, repair and rebuilding of this workstation. The parts are conventionally assembled and are made of conventional materials.

Although in FIGS. 4-10, the station 18 is shown being one lid wide (perpendicular to the plane of the drawing figure), in practice, it will preferably have a plurality of substantially identical work sites arranged transversally of the line 10, e.g. the same number of sites as there are mold cavities in one transversally extending row at differential pressure-thermoforming station 15 (e.g., four).

At the crimping station 110, each lid region has its surfaces 140, 142 engaged by opposed surfaces 144, 146 of the fixed and movable plates 30, 32, and forceably moved axially towards one another by an amount limited by engagement of stop surfaces on the tool members and/or by precise control of the amplitude of reciprocatory movement provided to the plate 30 by the pitman 34. While the structure 102 is being axially compressed to a predetermined extent, axial and radial support is provided for the structure 102 internally by the annular boss 148 on the crimping tool and radial support is provided externally by the peripheral wall 150 on the nest 120.

Figure 11:
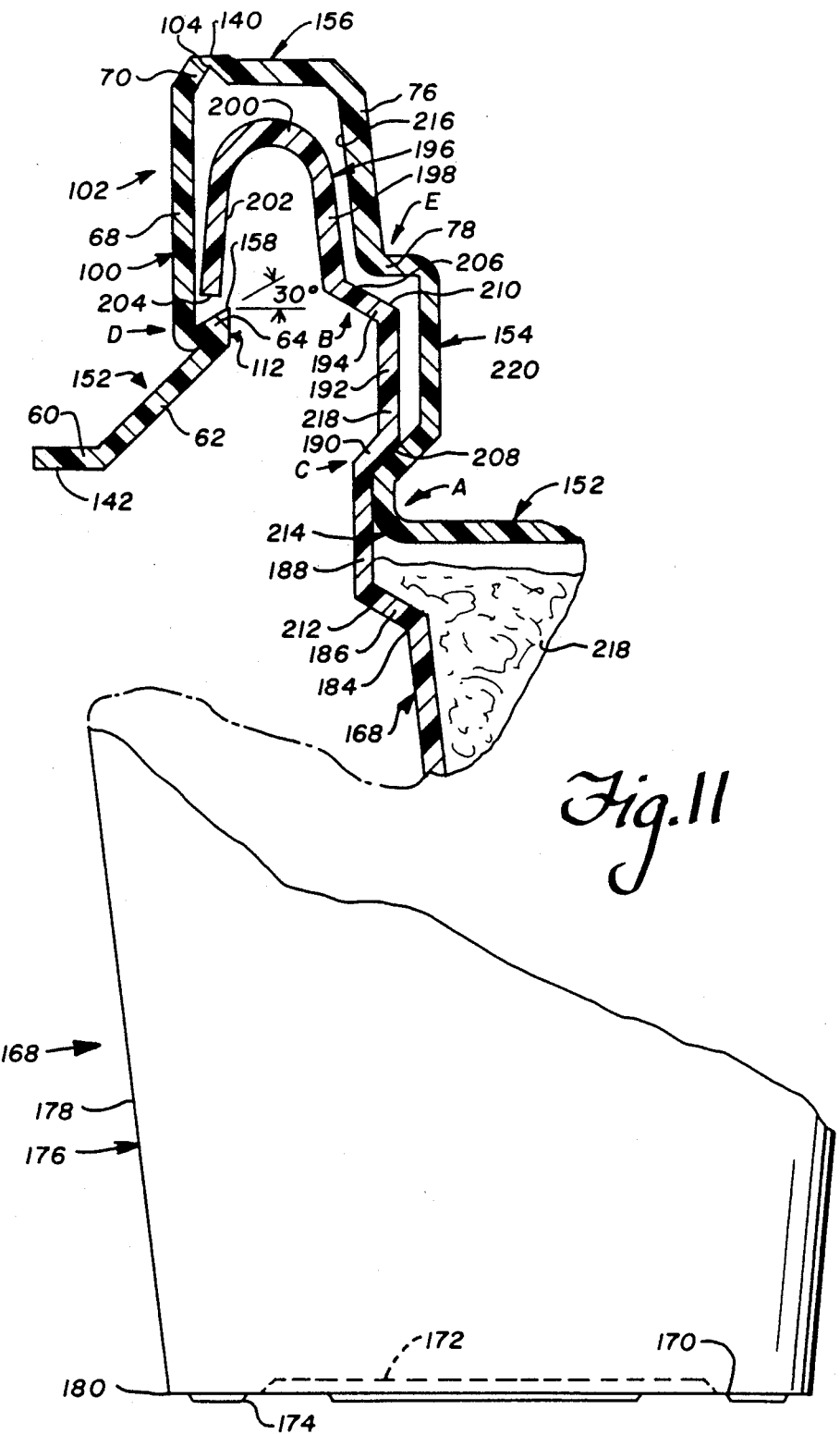
FIG. 11 is a fragmentary longitudinal sectional view of the lid to container body joint of the tamper-evident lidded container of the present invention.

The effect of the crimping station on a potential lid 50 can be seen by comparing the region 62, 64, 66 in FIG. 3, with the comparable region of the lid 152 as shown in FIG. 11. It will be noted that while the radially inner leg 154 and top wall 156 of the inverted U-shaped channel 102 have remained as they were, both as to shape and as to position relative to one another, all of this structure, as well as the portions 68, 70 of the outer leg 100 of the inverted U-shaped channel 102 have moved axially relatively downwards compared to the outer leg portions 60, 62, 64. The relative movement has been accomplished by telescopic collapsing of wall portion 66 which formerly flared upwardly, but now flares downwardly, thus providing a radially inwardly extending upwardly converging annular barb or hook 158 which partially obstructs the inverted U-shaped channel 102 at a level slightly below that of the shoulder 78. The deformation shown caused by the action of the crimping station 110 is permanent. The upper side of the hook is shown being disposed at an angle of 30° to horizontal.

The purpose of the trimming station is to cut each potential lid 50 from the sheet 20, thereby producing each actual lid 152 and the remainder of the sheet 20, which may be recycled to the extruder as indicated above.

As can easily be seen by studying FIGS. 6-10, the cut line 160 provided by the shearing action between the die edge 162 and the punch edge 164 is circular, except for two notches 166, preferably triangular, which are provided in the annular flange 60 and wall portion 62 at such angular positions and at such radial depths, that their apices nearly coincide with the juncture of the wall portion 62 with the base of the wall portion 64 at sites substantially directly underlying the respective ends of the line of weakness 104.

The purpose of the pilot is to center the potential lid 50 on the punch as the punch moves towards the die, so that the potential lid 50 will be accurately cut to produce a respective lid 152. As the punch shears against the die, the lid is expelled through the die shoe opening 130, ready to be decorated and packed for use on a filling line.

A container body or cup 168 is shown in FIG. 11, e.g. after it has been filled with contents, in a conventional way on a conventional filling line, and at a time when it has just received a lid 152, put in place in a conventional manner using a conventional lidding apparatus (not shown).

The cup 168 is shown being an integrally formed body of sheet material having a generally disk-shaped bottom wall 170, which may be conventionally provided with a shallow, broad, downwardly opening recess 172, i.e. in order to provide a radially outer annular foot 174 which permits the filled container to sit non-rockingly stable on a shelf, even when the weight of the contained product may have caused the bottom wall 170 to centrally distend somewhat. In the example of a twenty-four ounce size cottage cheese container, the bottom wall 170 may typically have an external outer diameter of 3.406 inches with the recess 172 having a lowermost external diameter of 2.419 inches, an uppermost external diameter of 2.233 inches and an uppermost depth of 0.093 inch, the recess sidewall 174 being conically tapered at e.g. a 45° angle. (All dimensions are given herein for illustrative, nonlimitative purposes.) The major portion 176 of the cup outer sidewall 178 conically flares upwardly, e.g. at a 6° angle (to vertical) from where it joins the radially outer periphery of the bottom wall 170 at a corner 180. The remaining upper portion of the outer sidewall of the cup 168 constitutes a rim and mouth region 182 which is composed of a plurality of adjoining circumferentially extending annular bands. In particular, starting from the axially upper extent 184 of the major portion 176 of the sidewall 178, the rim and mouth region 182 is shown including a lower stacking shoulder 186, e.g. which conically flares at an angle of 30° (to horizontal), a first cylindrical band 188, a partial return 190, e.g. which tapers at an angle of 45°, a second cylindrical band 192, an upper shoulder 194, e.g. which also flares at an angle of 30° (to horizontal), and an upwardly convex annular rim 196 having a rounded, inverted U-shaped cross-sectional shape which includes an inner leg 198, an upper end 200 and an outer leg 202 having a lower, outer edge 204. The wall 198 flares upwards slightly, in the preferred embodiment, and provides the mouth of the container body. The wall 202 flares downwards slightly.

Again, by way of example, the external diameter of the sidewall 178 at the axially upper extent of its main portion 176, i.e. at 184 is 4.244 inches; the external diameter of the first cylindrical band 188 is 4.328 inches.

The internal surface 206 of the upper stacking shoulder 194, the internal catch-providing surface 208 of the partial return 190, and the radially inner surface portion 210 of surface 206 provide a circumferential constriction in diameter for the mouth of the cup. The external wall surface 212 of the lower stacking shoulder 186 provides a lower stacking shoulder surface.

For efficient stacking, identical ones of the cups 168 may be deeply telescopically nested with the external lower stacking shoulder 186 of each upper cup resting on the internal upper stacking shoulder 194 of its neighboring next lower cup. Similarly, identical ones of the lids may be telescopically nested with the disk-like main portion 92 of each upper one resting on or near the lower radial flange 78 of its next lower neighbor, having been guided to that location by the centralizing effect of contact between the bead 214 of the upper lid with the inner camming surface 216 of the conically flaring band 76. Stacks of the nested empty cups and lids may be cartoned for storage and shipment. At the printing station and at the packing station, the stacks of empty cups 168 and lids 152 are subject to being de-nested by conventional, commerically available apparatus and techniques.

At a packer's the de-cartoned and de-nested cups 12 are conventionally conveyed through a filling station (not shown), where each cup in succession is filled by conventional means with a respective quantum of product, e.g. cottage cheese 218, up to a level that is sufficiently below the rim and mouth as to permit the cup to be lidded. Also, the de-cartoned nested lids 152 are de-nested and fed to a closing station (not shown), where each product-filled cup in succession is provided with a lid 152 which is axially, non-rotatively inserted into the mouth of the respective filled cup 168 and advanced downwards until it snaps into place as a sealing closure.

In the preferred embodiment illustrated, the lid 152 is provided with two places where it is at least slightly larger in external diameter than corresponding surfaces which it must pass on its way toward being fully received in closing relation in the cup mouth.

The first of these is where the lid bead at A must pass the partial constriction at B in order to become snap-locked in place with a seal provided at C. The second of these is axially and radially further out, where the outer edge of the rim flange of the lid must become snap-locked under the partial constriction provided by the internal hook at D. A positive stop against excessive telescopic advancement of the lid into the cup may be provided by engagement of the lid band corner at E with the upper stacking shoulder of the cup.

This ability of the lid to be snapped into place is dependent upon the resiliency of the plastic sheeting or equivalent material of which the cup and lid are manufactured.

Preferred angles for various features of the lid of the exemplary embodiment are indicated on FIG. 3. The diameter of the line of weakness is 4.597 inches at the apex of the inverted V-shaped formation. The vertical distance from the underside of the disk 92 to the underside of the upper end wall 72 is 0.357 inch. The region 214 of the lid is a radially outwardly convex bead with an upwardly tapering upper surface which matches the position and taper of a corresponding surface on the cup sidewall. Above that, the region 218 of the cup is designed to be received in the region 220 of the lid, and the rim 196 is designed to be received in the inverted U-shaped groove 102 so that the outer edge 204 is disposed radially outwardly and above the upper side of the hook 158.

The outer surface of the disk portion of the lid and/or the sidewall of the cup preferably is provided with a set of clear instructions for use of the tamper-evident feature for effecting the initial removal of the lid. A draft of a proposal for a set of instructions is provided in FIG. 12, e.g. on a label 230 for the lid.

Figure 12:
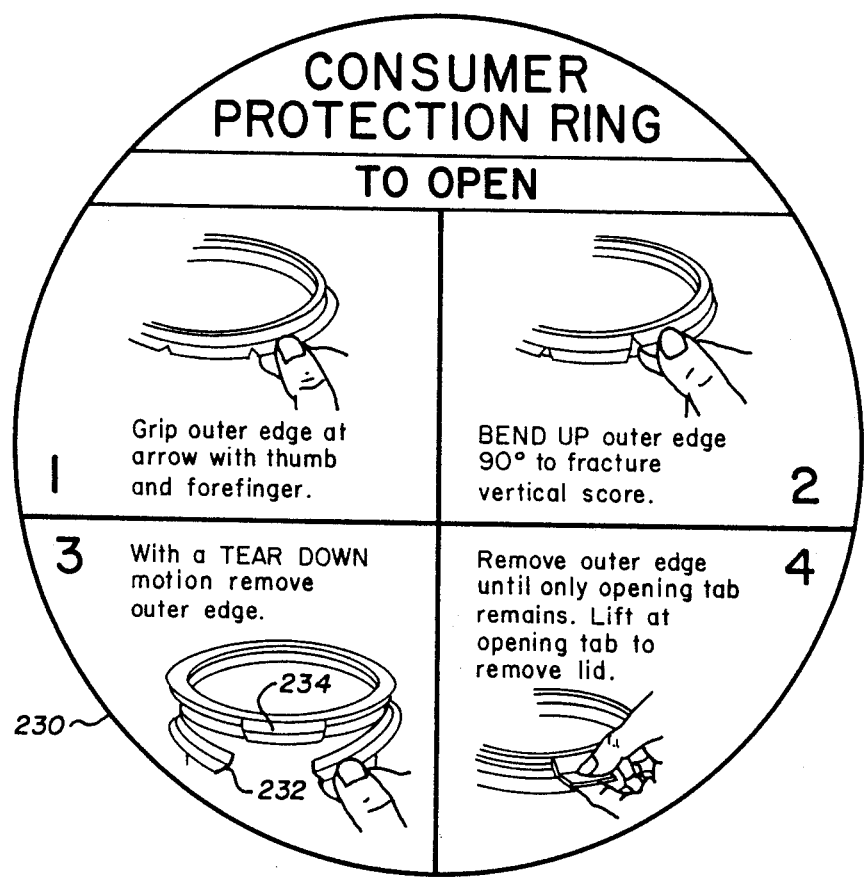
FIG. 12 is a plan view of one version of a proposed instructional label panel for a lidded container of the present invention.

In essence, once the filled container body is initially lidded by the filler, the outer edge of the container body rim catches on top of the barb on the lid and, in normal circumstances, the lid is thereby prevented from being removed, until the consumer, following the FIG. 12 instructions, severs the band (i.e. the barbed lid skirt 232) from the lid along the line of weakness 104, leaving the tab 234 available to be lifted to remove the lid from the container body. In re-use, the features at A, B, C removably hold the lid in place.

In breaking off the band 232, the user is considerably assisted by the fact that a significant portion of the thickness of the lid at the line of weakness is provided by the relatively brittle layer of crystal polystyrene coextruded to create the sheet at the station 12, due to the fact that as the lid is molded (FIGS. 2 and 3), proportionately more of the high impact polystyrene than of the crystal polystyrene tends to be moved laterally by the ridge 106 on the mold cavity in creating the line of weakness 104.

The method and apparatus for forming the lids as described herein is preferred, because it is easily accomplished on a line 10 without requiring the addition of more stations, or much more equipment, than is conventional. Alternative procedures could be used, such as converting steps shown performed by reciprocating tools into ones performed by rotating tools, altering the sequence of certain steps and the like.

It should now be apparent that the tamper-evident, differential pressure-thermoformed lidded plastic container and method for making the same as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A lid for a tamper-evident lidded container, comprising:
    a disk-like central portion made of thermoplastic sheet material integrally perimetrically surrounded by an inverted U-shaped channel portion having a radially inner wall, a top wall and a radially outer wall;
    means providing a circumferentially extending radially inwardly projecting barb in said outer wall having an obliquely axially upwardly and radially outwardly facing, radially inner engagement surface arranged to catch under a lower end of a downwardly directed rim of a container body as the lid is pushed, in use, onto the container body so as to enclose the rim from above, so as to position said barb for engagement with a radially inner sidewall surface of the rim at a radially inner corner of said lower end of said rim and thereby normally prevent non-destructive removal of the lid from the container body;
    said channel portion having an angularly extending line of weakness molded into said top wall thereof so as to extend thereon around at least a major proportion of the circumference of said channel portion, said line of weakness lying radially intermediate said inner wall and said outer wall of said channel member, said line of weakness having an inverted V-shaped profile in transverse cross-section.

2. The lid of claim 1, wherein:
    said lid is made of a sheet of polystyrene including an extruded main body of high impact polystyrene and an inner layer of crystal polystyrene coextruded therewith, said line of weakness being provided in said inner layer.

3. The lid of claim 2, wherein:
    said line of weakness has two opposite ends, said perimetrical line is located on an at least generally radially outwardly extending wall member which is contiguous with said outer wall of said channel portion, and said perimetrical line is formed so as to include two V-shaped notches which radially traverse substantially all of said generally radially outwardly extending wall member and are disposed in substantial alignment with and having apices pointing towards respective ends of said line of weakness, so that said lid may be partly destroyed in a controlled manner by ripping axially along two imaginary lines joining respective apices of said two notches with respective ends of said line of weakness, and then ripping angularly along said line of weakness from one end thereof to the other end thereof.

4. The lid of claim 3, further comprising:
    a circumferentially extending radially outwardly convex bulge provided in said inner wall of said channel portion adjacent said disk-shaped portion for removable engagement, in use, in a complementary formation on the container body for removably holding said lid on the container body after the lid has been partially destroyed by being torn along said line of weakness.

5. A tamper-evident lidded container comprising:
    container body having an upstanding peripheral sidewall providing a mouth defined at least in part by a rim having an outer portion which projects downwardly and terminates in a lower end which meets a radially inner sidewall surface of said rim, at a radially inner corner;
    a lid for said container body, said lid including
        a disk-like central portion made of thermoplastic sheet material integrally perimetrically surrounded by an inverted U-shaped channel portion having a radially inner wall, a top wall and a radially outer wall;
        means providing a circumferentially extending radially inwardly projecting barb in said outer wall having an obliquely axially upwardly and radially outwardly facing, radially inner engagement surface arranged to catch under a lower end of said outer portion of said rim of said container body as the lid is pushed, in use, onto the container body so as to enclose the rim from above, so as to position said barb for engagement with said radially inner sidewall surface of said outer portion of said rim at said radially inner corner, and thereby normally prevent non-destructive removal of the lid from the container body;
        said channel portion having an angularly extending line of weakness molded into said top wall thereof so as to extend thereon around at least a major proportion of the circumference of said channel portion, said line of weakness lying radially intermediate said inner wall and said outer wall of said channel member, said line of weakness having a an inverted V-shaped profile in transverse cross-section.

6. The tamper-evident lidded container of claim 5, wherein:
    said lid is made of an extruded sheet of polystyrene including a main body of high impact polystyrene and an inner layer of crystal polystyrene coextruded therewith, said line of weakness being provided in said inner layer.

7. The tamper-evident lidded container of claim 6, wherein:

said line of weakness has two opposite ends, said perimetrically line is located on an at least generally radially outwardly extending wall member which is contiguous with said outer wall of said channel portion, and said perimetrical line is formed so as to include two V-shaped notches which radially traverse substantially all of said generally radially outwardly extending wall member and are disposed in substantial alignment with and having apices pointing towards respective ends of said line of weakness, so that said lid may be partly destroyed in a controlled manner by ripping axially along two imaginary lines joining respective apices of said two notches with respective ends of said line of weakness, and then ripping angularly along said line of weakness from one end thereof to the other end thereof.

8. The tamper-evident lidded container of claim 7, further comprising:
a circumferentially extending radially outwardly convex bulge provided in said inner wall of said channel portion adjacent said disk-shaped portion for removable engagement, in use, in a complementary formation on the container body for removably holding said lid on the container body after the lid has been partially destroyed by being torn along said line of weakness.

9. The tamper-evident lidded container of claim 5, further comprising:
said container body containing a filling of a product;
said lid being disposed in a condition wherein said channel portion encloses said rim from above and said barb projects inwardly towards said inner wall of said U-shaped channel portion and catches under said lower end of said rim.

10. The tamper-evident lidded container of claim 9, wherein:
said product is a foodstuff.

11. The tamper-evident lidded container of claim 10, wherein:
said foodstuff is cottage cheese.

* * * * *